United States Patent
Gusi et al.

(10) Patent No.: US 11,947,019 B2
(45) Date of Patent: Apr. 2, 2024

(54) SECONDARY CODE DETERMINATION IN A SNAPSHOT RECEIVER BASED UPON TRANSMISSION TIME ALIGNMENT

(71) Applicant: Albora Technologies Limited, Ilford (GB)

(72) Inventors: Adrià Gusi, Barcelona (ES); Pau Closas, London (GB); Xiao Liu, Barcelona (ES)

(73) Assignee: ALBORA TECHNOLOGIES LIMITED, London (GB)

( * ) Notice: Subject to any disclaimer, the term of this patent is extended or adjusted under 35 U.S.C. 154(b) by 172 days.

(21) Appl. No.: 17/494,249

(22) Filed: Oct. 5, 2021

(65) Prior Publication Data
US 2023/0106040 A1    Apr. 6, 2023

(51) Int. Cl.
*G01S 19/24* (2010.01)
*G01S 19/43* (2010.01)
*G01S 19/23* (2010.01)

(52) U.S. Cl.
CPC ............ *G01S 19/246* (2013.01); *G01S 19/24* (2013.01); *G01S 19/43* (2013.01); *G01S 19/23* (2013.01)

(58) Field of Classification Search
CPC ......... G01S 19/246; G01S 19/23; G01S 19/43
USPC ........................... 342/357.26, 357.62, 357.63
See application file for complete search history.

(56) References Cited

U.S. PATENT DOCUMENTS

| | | | | |
|---|---|---|---|---|
| 8,179,311 | B2 * | 5/2012 | Ghinamo | G01S 19/246 342/357.63 |
| 10,884,137 | B2 * | 1/2021 | Kanda | G01S 19/30 |
| 2011/0103433 | A1 * | 5/2011 | Krasner | G01S 19/30 375/150 |
| 2017/0285171 | A1 * | 10/2017 | Ries | H04K 1/00 |
| 2020/0116869 | A1 * | 4/2020 | Lennen | G01S 19/34 |
| 2021/0286088 | A1 * | 9/2021 | Cheng | G01S 19/29 |
| 2022/0196850 | A1 * | 6/2022 | Ribot | G01S 19/246 |
| 2023/0131074 | A1 * | 4/2023 | Sornin | G01S 19/09 455/456.1 |

FOREIGN PATENT DOCUMENTS

CN    102124371 A  *  7/2011  ............ G01S 19/44

\* cited by examiner

*Primary Examiner* — Chuong P Nguyen
(74) *Attorney, Agent, or Firm* — CRGO Global; Steven M. Greenberg

(57) ABSTRACT

The carrier phase ready coherent acquisition of a global navigation satellite system (GNSS) snapshot signal includes receiving in a snapshot receiver different GNSS signals from correspondingly different GNSS satellites, and performing multi-hypothesis (MH) acquisition upon each of GNSS signal in order to produce a complete set of secondary code index hypotheses, each hypothesis producing a corresponding acquisition result according to an identified peak at a correct code-phase and Doppler frequency. The secondary code index hypotheses are adjusted for each different GNSS signal based upon a flight time difference determined for each GNSS satellite, so as to produce a new set of hypotheses. Finally, one of the hypotheses in the new set may be selected as a correct hypothesis according to a predominate common index amongst the hypotheses in the new set, and the acquisition results for each of the different GNSS signals may be filtered utilizing the correct hypothesis.

12 Claims, 3 Drawing Sheets

SECONDARY CODE DETERMINATION IN A SNAPSHOT RECEIVER BASED UPON TRANSMISSION TIME ALIGNMENT

BACKGROUND OF THE INVENTION

Field of the Invention

The present invention relates to the field of global navigation satellite system (GNSS) position determination in satellite-based global positioning systems.

Description of the Related Art

Satellite-based positioning refers to the position, velocity and time (PVT) determination for a GNSS receiver according to GNSS positioning data within signals such as those produced by the global positioning system (GPS), Global Navigation Satellite System (GLONASS), Galileo, NavIC and BeiDou. The core signal for GNSS is a direct-sequence spread-spectrum signal, synchronously transmitted by each satellite in a GNSS satellite constellation. The spread-spectrum signal includes both a ranging code, also referred to as the pseudorandom noise (PRN) spreading sequence, and also a low-rate data-link which broadcasts ephemeris information for the corresponding satellite Each GNSS receiver receives the GNSS signal from which the GNSS receiver estimates PVT. To do so, programmatic logic executing in coordination with the GNSS receiver estimates the ranging code in the signal model so as to construct a set of observables for each satellite from which the GNSS signal had been received. The observables in the set includes a series of ranges computed from the time delay of the receipt of the corresponding GNSS signal, referred to as pseudoranges, and also phase-difference estimates, referred to as carrier-phase measurements, between the different GNSS signals. With the observables, computing PVT is a matter of solving for a multilateration of the observables within a least squares algorithm.

Traditionally, the computation of PVT is a two-step process. The first step of the process produces a coarse estimate of synchronization parameters based upon the unpolished received signal data. Additionally, this first step might involve a refinement of the coarse estimate utilizing either finer acquisition or tracking loops. More precisely, in the first step, estimates of time delay and Doppler shifts are determined from the spread spectrum signals received from a selection of the satellites. In the second step, referred to as the "navigation solution", the GNSS observables are processed in order to estimate PVT of the GNSS receiver.

In order to achieve centimeter-level GNSS positioning accuracy, it is necessary to make use of the carrier-phase measurements of the received signal. However, when the received signal is extremely short, for instance a snapshot signal, the phase measurements cannot be determined properly in the traditional way due to uncertainties in the encoded data bits of the GNSS signal. To wit, the carrier-phase measurements are generated by exploiting the angle of the complex correlator output, namely the correlation between the received signal and the local replica. As such, if the bits with opposite signs are considered in the local replica signal, the resulting energy magnitude will remain the same and thus still be detected by the acquisition module. However, if the angle is one-hundred eighty degrees shifted to the actual angle, a half-cycle phase error will be produced. In either circumstance, it remains important to avoid the phase measurements being impacted by the ambiguity of the secondary code hypothesis.

BRIEF SUMMARY OF THE INVENTION

Embodiments of the present invention address technical deficiencies of the art in respect to the coherent acquisition of a GNSS snapshot signal. To that end, embodiments of the present invention provide for a novel and non-obvious method for carrier phase ready coherent acquisition of a GNSS snapshot signal. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a method for carrier phase ready coherent acquisition of a GNSS snapshot signal includes a receipt in a snapshot receiver of different GNSS signals from correspondingly different GNSS satellites. The method additionally includes the performance of multi-hypothesis (MH) acquisition upon each of the different GNSS signals in order to produce a complete set of secondary code index hypotheses, each producing corresponding acquisition results according to an identified peak at a correct code-phase and Doppler frequency. The method yet further includes an adjustment of the secondary code index hypotheses for each of the different GNSS signals of the correspondingly different GNSS satellites based upon a flight time difference determined for each of the different GNSS satellites, so as to produce a new set of secondary code index hypotheses. Finally, the method includes a filtering of the new set to include only ones of the secondary code index hypothesis in the new set having a predominate common index at a common moment in time and an application of the remaining ones of the secondary code index hypotheses in the new set to respective ones of the GNSS signals in order to acquire the GNSS signals.

In one aspect of the embodiment, a coarse time filter (CTF) solves for a one millisecond (1 ms) ambiguity of signal flight time based on assistance data and computes the flight time difference for each of the GNSS satellites. As such, the adjustment can include a shifting of each of the secondary code index hypotheses in the complete set by an amount corresponding to the flight time difference computed by the CFT. As well, the adjustment further can include, for each one of the secondary code index hypotheses in the new set corresponding to one of the GNSS signals, a shifting back of each one of the secondary code index hypothesis in the new set by the flight time difference computed by the CFT for a corresponding one of the GNSS signals.

In another embodiment of the invention, a data processing system is adapted for carrier phase ready coherent acquisition of a GNSS snapshot signal. The system includes a host computing platform having one or more computers, each with memory and one or processing units including one or more processing cores. The system also includes an acquisition module. The module in turn includes computer program instructions that are enabled while executing in the memory of one or more of the processing units of the host computing platform to receive from a snapshot receiver different GNSS signals from correspondingly different GNSS satellites and to perform MH acquisition upon each of the different GNSS signals in order to produce a complete set of secondary code index hypotheses and corresponding acquisition results according to an identified peak at a correct code-phase and Doppler frequency. The program instructions then adjust the secondary code index hypotheses for each of the different GNSS signals of the correspondingly different GNSS satellites based upon a flight time difference determined for each of the different GNSS satellites, the adjustment producing a new set of secondary code index hypotheses. Finally, the program instructions filter the new set to include only ones of the secondary code index hypothesis in the new set having a predominate common index at a common moment in time and an application of the remaining ones of the secondary code index hypotheses in the new set to respective ones of the GNSS signals in order to acquire the GNSS signals.

In this way, the technical deficiencies of determining carrier phase measurements despite having received an extremely short signal like a snapshot signal, resulting in uncertainties in the encoded data bits of the GNSS signal, may be overcome. Specifically, the foregoing deficiencies may be overcome in consequence of the creation of the new set of secondary code index hypotheses of different shifted indexes from which a correct hypothesis may be selected according to a common identified flight time different between the GNSS satellites. Then the selected, correct hypothesis may be used to filter the acquisition results. And the correct hypothesis will have been selected despite the short nature of the snapshot signal and without overly complex processing likely to undesirably consume the power resources of a roving GNSS signal receiver.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for carrier phase ready coherent acquisition of a GNSS snapshot signal. In accordance with an embodiment of the invention, a snapshot receiver receives different GNSS signals from different GNSS satellites in a GNSS satellite constellation. MH acquisition is then performed upon each received GNSS signal, the MH acquisition producing both a complete set of secondary code index hypotheses and also corresponding acquisition results according to peak that has been identified at a correct code-phase and Doppler frequency. Importantly, a new set of secondary code index hypotheses is then computed through an adjustment of each of the hypotheses in the complete set in relationship to a determined flight time difference for a GNSS satellite of a corresponding GNSS signal. Finally, the new set may be filtered to include only the secondary code index hypotheses in the new set that have a predominate common index at a common moment in time and then the remaining secondary code index hypotheses in the new set can be applied to respective GNSS signals in order to acquire the GNSS signals.

Figure 1:
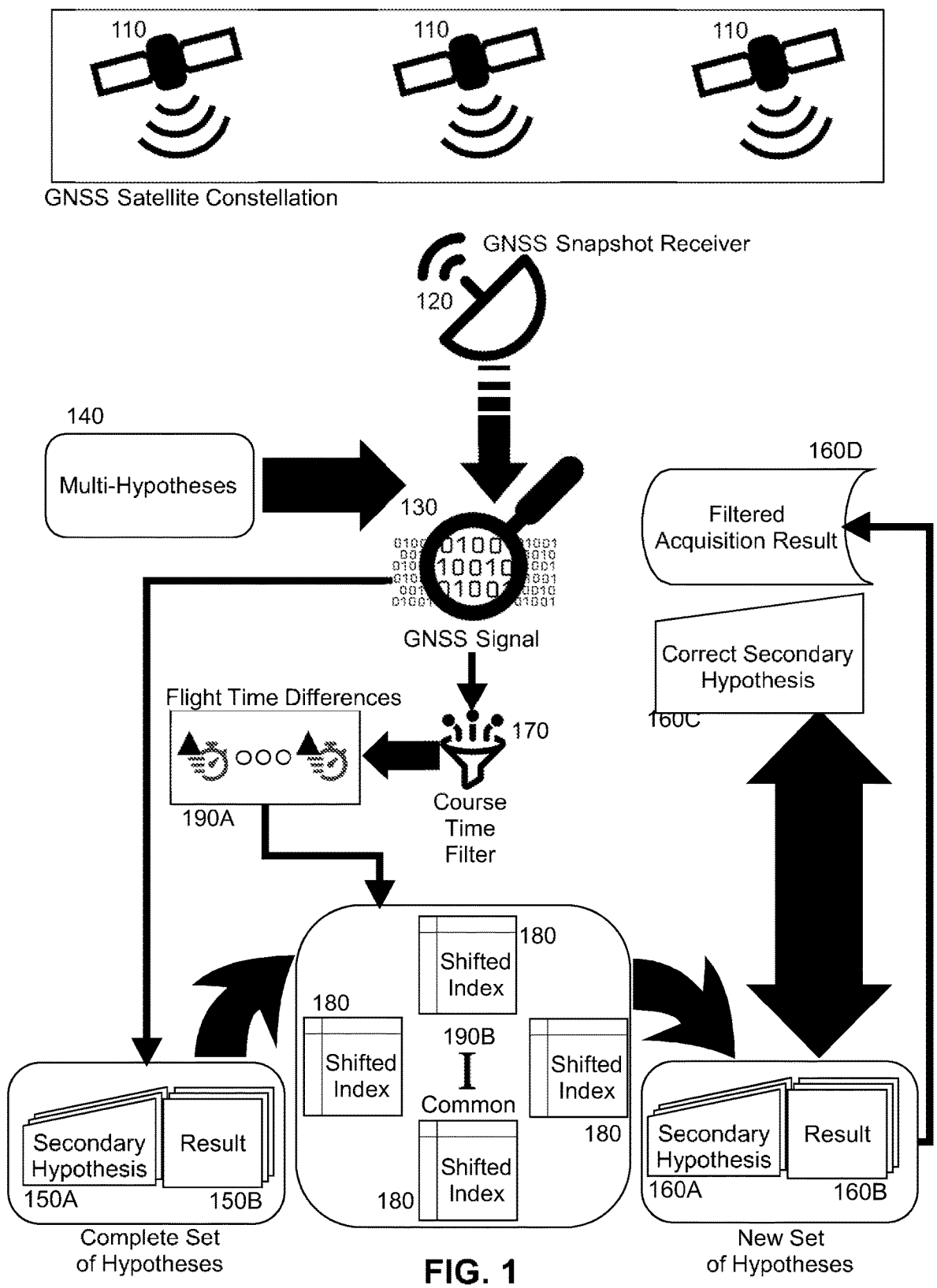
FIG. 1 is a pictorial illustration reflecting different aspects of a process of carrier phase ready coherent acquisition of a GNSS snapshot signal.

In illustration of one aspect of the embodiment, FIG. 1 pictorially shows a process of carrier phase ready coherent acquisition of a GNSS snapshot signal. As shown in FIG. 1, different GNSS signals 130 are received in a snapshot receiver 120 from different satellites 110 in a GNSS satellite constellation. An MH acquisition process 140 is then applied to each corresponding one of the GNSS signals 130 in order to produce, for the GNSS signals 130, a complete set of secondary code index hypotheses 150A and associated acquisition results 150B produced by comparing each of the hypotheses 150A to each one of the GNSS signals 130 with a resulting signal having an identified peak at a correct code-phase and Doppler frequency. As it will be understood, the complete set of secondary code index hypotheses represents of all possible secondary code index hypotheses that lead to a potential acquisition for the corresponding one of the GNSS signals 130.

Then, a coarse time filter 170 computes flight time differences 190A between each of the GNSS signals 130 for each of the satellites 110. With respect to each of the secondary hypotheses 150A in the complete set of hypotheses for a corresponding one of the GNSS signals 130 of a respectively corresponding one of the satellites 110, the secondary hypotheses 150 are each shifted by an integer amount of one of the flight time differences 190A for the respectively corresponding one of the satellites 110. The result is a set of shifted indexes 180, one for each of the GNSS signals 130 so that a new set of secondary hypotheses 160A and associated acquisition results 160B are created in correspondence only to those of the shifted indexes 180 associated with a common index 190B favored by a dominant portion of the shifted indexes 180. Those of the shifted indexes 180 lacking the common index are excluded from the new set of secondary hypotheses 160A.

Subsequently, the secondary hypotheses 160A of the new set of hypotheses are each shifted back according to a corresponding flight time difference 190A and each of the secondary hypotheses 160A is then compared to the corresponding one of the GNSS signals 130 in order to select the correct secondary code index hypothesis 160C. The associated acquisition result 160 is then filtered from the new set of hypothesis so as to achieve signal acquisition for the respectively corresponding one of the satellites 110 without having exposed the outcome to half-cycle errors as would have otherwise been the case were the secondary code index hypotheses 150A of the complete set to have been utilized alone in the acquisition of the GNSS signals 130.

Figure 2:
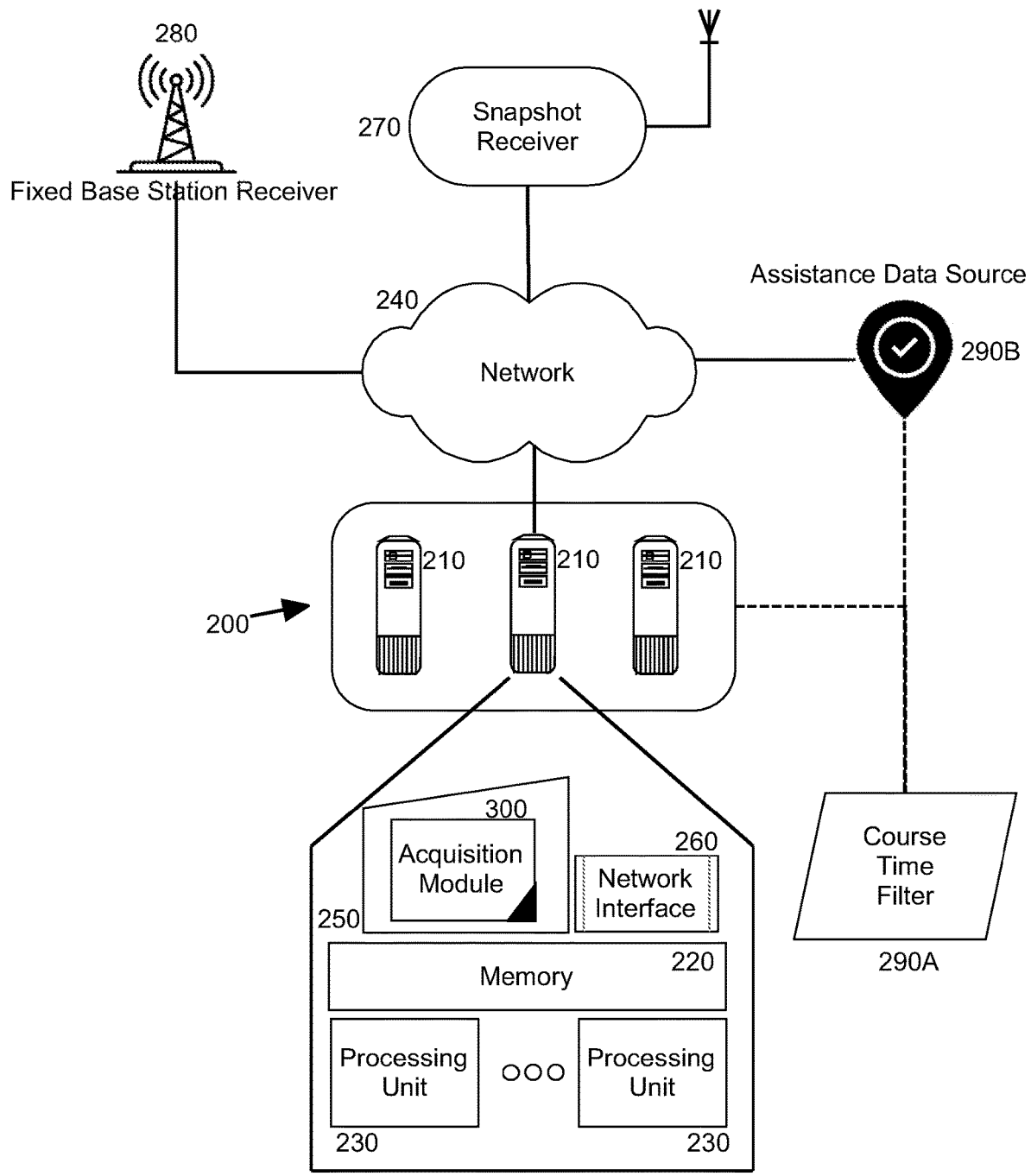
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to perform carrier phase ready coherent acquisition of a GNSS snapshot signal. In the data processing system illustrated in FIG. 1, a host computing platform 200 is provided. The host computing platform 200 includes one or more computers 210, each with memory 220 and one or more processing units 230. The computers 210 of the host computing platform (only a single computer shown for the purpose of illustrative simplicity) can be co-located within one another and in communication with one another over a local area network, or over a data communications bus, or the computers can be remotely disposed from one another and in communication with one another through network interface 260 over a data communications network 240.

The host computing platform 200 is communicatively coupled over computer communications network 240 both to a fixed base station 280 and to a roving snapshot receiver 270. Both the base station 280 and the roving snapshot receiver 270 are operable to receive multiple different GNSS signals from multiple different transmitting satellites in a GNSS constellation. Notably, a computing device 250 including a non-transitory computer readable storage medium can be included with the host computing platform 200 and accessed by the processing units 230 of one or more of the computers 210. The computing device stores 250 thereon or retains therein a program module 300 that includes computer program instructions which when executed by one or more of the processing units 230, performs a programmatically executable process for carrier phase ready coherent acquisition of a GNSS snapshot signal.

Specifically, the program instructions during execution receive from the snapshot receiver 270 from over the computer communications network 240, different GNSS signals in digital form having been demodulated and coarse processed within the snapshot receiver 270. For the different GNSS signals, each of a corresponding satellite, the program instructions generate a complete set of secondary code index hypotheses resulting from an application by the program instructions of an MH acquisition process. As it will be understood, for each of the secondary code index hypotheses, an acquisition result in comparison to a corresponding one of the GNSS signals will be associated therewith in which the result has an identified peak at a correct code-phase and Doppler frequency.

The program instructions then receive from a coarse time filter 290A which in turn utilizes assistance data source 290B in order to resolve one millisecond ambiguity, a determination of flight time differences for each of the satellites in association with each of the corresponding GNSS signals. Consequently, the program instructions, for each of the GNSS signals, shift each of the secondary code index hypothesis by an integer value of a flight time difference received from the coarse time filter 290B in connection with the corresponding one of the GNSS signals. The program instructions then locate amongst the shifted indexes, a common integer value which is determined to be predominant amongst the different shifted indexes, for instance based upon a maximum voting or highest probability algorithm.

Figure 3:
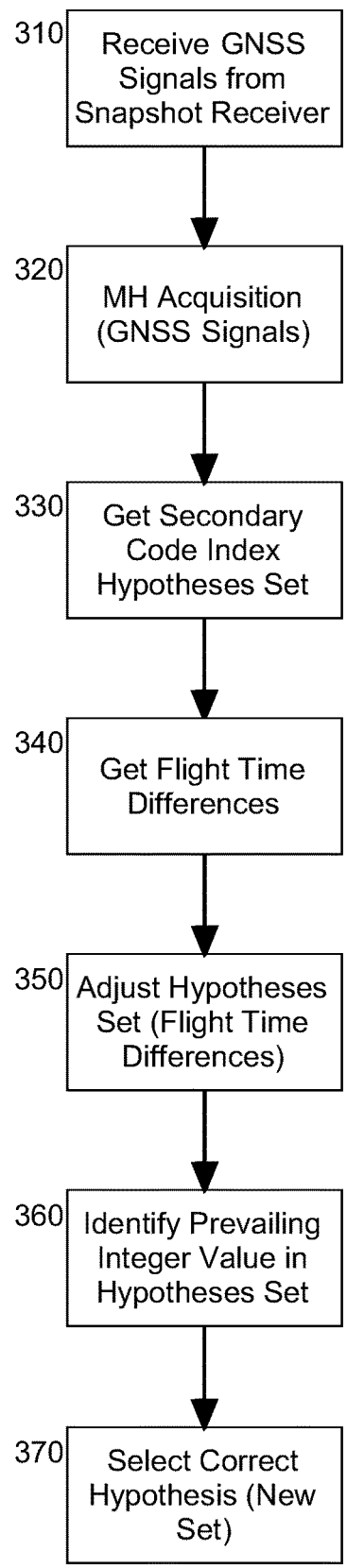

Once the common integer value is selected, the program instructions filter out those of the different indexes lacking the common integer value and the program instructions shift back the remaining shifted indexes so as to create a new set of secondary code index hypotheses. Subsequently, the program instructions select one of the secondary code index hypothesis in the new set as the correct hypothesis for application to a corresponding one of the GNSS signals. In further illustration of an exemplary operation of the module, FIG. 3 is a flow chart illustrating one of the aspects of the process of FIG. 1. Beginning in block 310, multiple different GNSS signals are received from a snapshot receiver from over a computer communications network. In block 320, each of the GNSS signals are subjected to MH acquisition in order to produce in block 330 a complete set of secondary code index hypotheses and associated results.

In block 340, a coarse time filter provides flight time differences for each of the GNSS signals and in block 350, each of the hypotheses in the complete set are shifted by a corresponding one of the flight time differences so as to produce a set of shifted indexes. Then, in block 360, a prevailing integer value amongst the shifted indexes at a common temporal location in each of the shifted indexes can be identifies, such as by applying a maximum voting technique or highest probability technique. Thereafter, in block 370 a correct hypothesis in the new set is selected according to the prevailing integer value.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for carrier phase ready coherent acquisition of a global navigation satellite system (GNSS) snapshot signal comprising:
   receiving in a snapshot receiver different GNSS signals from correspondingly different GNSS satellites;
   performing multi-hypothesis (MH) acquisition upon each of the different GNSS signals in order to produce a complete set of secondary code index hypotheses and corresponding acquisition results by comparing each of the secondary code index hypotheses to each one of the different GNSS signals with a resulting signal having an identified peak at a correct code-phase and Doppler frequency;
   adjusting the secondary code index hypotheses for each of the different GNSS signals of the correspondingly different GNSS satellites based upon a flight time difference determined for each of the different GNSS satellites by shifting the secondary code index hypotheses by an integer amount of one of the flight time differences for the respectively corresponding one of the GNSS satellites, the adjustment producing a new set of secondary code index hypotheses for a set of shifted indexes, one for each of the GNSS signals;
   filtering the new set to include only ones of the secondary code index hypothesis in the new set having a predominate common index at a common moment in time comprising only those of the shifted indexes of the set of shifted indexes associated with a common index favored by a dominant portion of the shifted indexes; and,
   applying remaining ones of the secondary code index hypotheses in the new set to respective ones of the GNSS signals in order to acquire the GNSS signals.

2. The method of claim 1, wherein a coarse time filter (CTF) solves for a one millisecond (1 ms) ambiguity of signal flight time and computes the flight time difference for each of the GNSS satellites.

3. The method of claim 2, wherein the adjustment comprises shifting each of the secondary code index hypotheses in the complete set by an amount corresponding to the flight time difference computed by the CFT.

4. The method of claim 3, wherein the adjustment further includes, for each one of the secondary code index hypotheses in the new set corresponding to one of the GNSS signals, shifting back the one of the secondary code index hypothesis by the flight time difference computed by the CFT for a corresponding one of the GNSS signals.

5. A data processing system adapted for carrier phase ready coherent acquisition of a global navigation satellite system (GNSS) snapshot signal, the system comprising:
   a host computing platform comprising one or more computers, each with memory and one or processing units including one or more processing cores; and,
   an acquisition module comprising computer program instructions enabled while executing in the memory of at least one of the processing units of the host computing platform to perform:
   receiving in a snapshot receiver different GNSS signals from correspondingly different GNSS satellites;
   performing multi-hypothesis (MH) acquisition upon each of the different GNSS signals in order to produce a complete set of secondary code index hypotheses and corresponding acquisition results by comparing each of the secondary code index hypotheses to each one of the different GNSS signals with a resulting signal having an identified peak at a correct code-phase and Doppler frequency;
   adjusting the secondary code index hypotheses for each of the different GNSS signals of the correspondingly different GNSS satellites based upon a flight time difference determined for each of the different GNSS satellites by shifting the secondary code index hypotheses by an integer amount of one of the flight time differences for the respectively corresponding one of the GNSS satellites, the adjustment producing a new set of secondary code index hypotheses for a set of shifted indexes, one for each of the GNSS signals;
   filtering the new set to include only ones of the secondary code index hypothesis in the new set having a predominate common index at a common moment in time comprising only those of the shifted indexes of the set of shifted indexes associated with a common index favored by a dominant portion of the shifted indexes; and,
   applying remaining ones of the secondary code index hypotheses in the new set to respective ones of the GNSS signals in order to acquire the GNSS signals.

6. The system of claim 5, wherein a coarse time filter (CTF) solves for a one millisecond (1 ms) ambiguity of signal flight time based on assistance data and computes the flight time difference for each of the GNSS satellites.

7. The system of claim 6, wherein the adjustment comprises shifting each of the secondary code index hypotheses in the complete set by an amount corresponding to the flight time difference computed by the CFT.

8. The system of claim 7, wherein the adjustment further includes, for each one of the secondary code index hypotheses in the new set corresponding to one of the GNSS signals, shifting back the one of the secondary code index hypothesis by the flight time difference computed by the CFT for a corresponding one of the GNSS signals.

9. A computing device comprising a nontransitory computer readable storage medium having program instructions stored therein, the instructions being executable by at least one processing core of a processing unit to cause the processing unit to perform a method for carrier phase ready coherent acquisition of a global navigation satellite system (GNSS) snapshot signal, the method including:
  receiving in a snapshot receiver different GNSS signals from correspondingly different GNSS satellites;
  performing multi-hypothesis (MH) acquisition upon each of the different GNSS signals in order to produce a complete set of secondary code index hypotheses and corresponding acquisition results by comparing each of the secondary code index hypotheses to each one of the different GNSS signals with a resulting signal having an identified peak at a correct code-phase and Doppler frequency;
  adjusting the secondary code index hypotheses for each of the different GNSS signals of the correspondingly different GNSS satellites based upon a flight time difference determined for each of the different GNSS satellites by shifting the secondary code index hypotheses by an integer amount of one of the flight time differences for the respectively corresponding one of the GNSS satellites, the adjustment producing a new set of secondary code index hypotheses for a set of shifted indexes, one for each of the GNSS signals;
  filtering the new set to include only ones of the secondary code index hypothesis in the new set having a predominate common index at a common moment in time comprising only those of the shifted indexes of the set of shifted indexes associated with a common index favored by a dominant portion of the shifted indexes; and,
  applying remaining ones of the secondary code index hypotheses in the new set to respective ones of the GNSS signals in order to acquire the GNSS signals.

10. The device of claim 9, wherein a coarse time filter (CTF) solves for a one millisecond (1 ms) ambiguity of signal flight time and computes the flight time difference for each of the GNSS satellites.

11. The device of claim 10, wherein the adjustment comprises shifting each of the secondary code index hypotheses in the complete set by an amount corresponding to the flight time difference computed by the CFT.

12. The device of claim 11, wherein the adjustment further includes, for each one of the secondary code index hypotheses in the new set corresponding to one of the GNSS signals, shifting back the one of the secondary code index hypothesis by the flight time difference computed by the CFT for a corresponding one of the GNSS signals.

* * * * *